United States Patent
Welter et al.

(10) Patent No.: US 7,742,948 B2
(45) Date of Patent: Jun. 22, 2010

(54) METHOD OF AND SYSTEM FOR ALLOCATING AN OTB-RELEVANT PURCHASING CONTRACT

(75) Inventors: Markus Welter, Ottweiler (DE); Alexander Grendel, Bad Schönborn (DE)

(73) Assignee: SAP Aktiengesellschaft, Walldorf (DE)

( * ) Notice: Subject to any disclaimer, the term of this patent is extended or adjusted under 35 U.S.C. 154(b) by 1332 days.

(21) Appl. No.: 10/933,127

(22) Filed: Sep. 2, 2004

(65) Prior Publication Data

US 2005/0216359 A1    Sep. 29, 2005

Related U.S. Application Data

(60) Provisional application No. 60/551,221, filed on Mar. 8, 2004, provisional application No. 60/563,284, filed on Apr. 16, 2004.

(51) Int. Cl.
*G06Q 30/00* (2006.01)
(52) U.S. Cl. .............................. 705/26; 705/8
(58) Field of Classification Search .............. 705/26, 705/27, 7, 8, 29, 80
See application file for complete search history.

(56) References Cited

U.S. PATENT DOCUMENTS

| | | | |
|---|---|---|---|
| 4,752,877 A * | 6/1988 | Roberts et al. ............ 705/36 R |
| 5,315,508 A | 5/1994 | Bain et al. |
| 5,400,253 A | 3/1995 | O'Connor |
| 5,615,109 A | 3/1997 | Eder |
| 5,758,327 A | 5/1998 | Gardner et al. |
| 5,870,716 A | 2/1999 | Sugiyama et al. |
| 5,930,771 A | 7/1999 | Stapp |
| 5,999,914 A | 12/1999 | Blinn et al. |
| 6,029,139 A | 2/2000 | Cunningham et al. |
| 6,064,984 A | 5/2000 | Ferguson et al. |
| 6,341,351 B1 | 1/2002 | Muralidhran et al. |

(Continued)

FOREIGN PATENT DOCUMENTS

JP    2004-030343 A    1/2004

(Continued)

OTHER PUBLICATIONS

Donald A. Jensen, Jr., Ph.D. et al. "Long-term Construction Contracts: The Impact of Tamra '88 on Revenue Recognition", Journal of Construction Education, Spring 1997, vol. 2, No. 1, pp. 37-53.*

(Continued)

*Primary Examiner*—Jeffrey A. Smith
*Assistant Examiner*—Adam Levine
(74) *Attorney, Agent, or Firm*—Foley & Lardner LLP

(57) ABSTRACT

A method of and system for allocating a purchasing contract over a temporal period associated with the purchasing contract is disclosed. The method includes receiving data regarding the purchasing contract in a computerized system, distributing the received data regarding the purchasing contract over the associated temporal period, and applying at least one rule to the distributed data to determine whether the distribution of the data regarding the purchasing contract should be accepted or rejected. The system includes means for receiving data regarding the purchasing contract, means for distributing the received data regarding the purchasing contract over the associated temporal period, and means for applying at least one rule to the distributed data to determine whether the distribution of the data regarding the purchasing contract should be accepted or rejected.

69 Claims, 8 Drawing Sheets

U.S. PATENT DOCUMENTS

| | | |
|---|---|---|
| 6,505,093 B1 | 1/2003 | Thatcher et al. |
| 6,507,851 B1 | 1/2003 | Fugiwara et al. |
| 6,701,299 B2 | 3/2004 | Kraisser et al. |
| 6,725,204 B1 * | 4/2004 | Gusley .................. 705/26 |
| 6,868,528 B2 | 3/2005 | Roberts |
| 6,910,017 B1 | 6/2005 | Woo et al. |
| 6,980,966 B1 | 12/2005 | Sobrado et al. |
| 7,016,859 B2 * | 3/2006 | Whitesage .................. 705/8 |
| 7,080,030 B2 | 7/2006 | Eglen et al. |
| 7,082,408 B1 | 7/2006 | Baumann et al. |
| 7,092,929 B1 | 8/2006 | Dvorak et al. |
| 7,117,165 B1 | 10/2006 | Adams et al. |
| 7,124,098 B2 | 10/2006 | Hopson et al. |
| 7,124,984 B2 | 10/2006 | Yokouchi et al. |
| 7,139,731 B1 | 11/2006 | Alvin |
| 2001/0019778 A1 | 9/2001 | Gardaz et al. |
| 2001/0032130 A1 | 10/2001 | Gabos et al. |
| 2001/0039517 A1 | 11/2001 | Kawakatsu |
| 2001/0049634 A1 | 12/2001 | Stewart |
| 2002/0013731 A1 | 1/2002 | Bright et al. |
| 2002/0023500 A1 | 2/2002 | Chikuan et al. |
| 2002/0026368 A1 | 2/2002 | Carter, III |
| 2002/0059108 A1 | 5/2002 | Okura et al. |
| 2002/0072986 A1 | 6/2002 | Aram |
| 2002/0073114 A1 | 6/2002 | Nicastro et al. |
| 2002/0078159 A1 | 6/2002 | Petrogiannis et al. |
| 2002/0107713 A1 | 8/2002 | Hawkins |
| 2002/0116241 A1 | 8/2002 | Sandhu et al. |
| 2002/0123930 A1 | 9/2002 | Boyd et al. |
| 2002/0138290 A1 | 9/2002 | Metcalfe et al. |
| 2002/0147668 A1 | 10/2002 | Smith et al. |
| 2002/0152128 A1 | 10/2002 | Walch et al. |
| 2002/0184116 A1 | 12/2002 | Tam et al. |
| 2003/0023500 A1 | 1/2003 | Boies et al. |
| 2003/0028393 A1 | 2/2003 | Coulston et al. |
| 2003/0028437 A1 | 2/2003 | Grant et al. |
| 2003/0046120 A1 | 3/2003 | Hoffman et al. |
| 2003/0046195 A1 | 3/2003 | Mao |
| 2003/0050852 A1 | 3/2003 | Liao et al. |
| 2003/0074269 A1 | 4/2003 | Viswanath |
| 2003/0126024 A1 | 7/2003 | Crampton et al. |
| 2003/0144916 A1 | 7/2003 | Mumm et al. |
| 2003/0149631 A1 | 8/2003 | Crampton et al. |
| 2003/0149674 A1 | 8/2003 | Good et al. |
| 2003/0158791 A1 | 8/2003 | Gilberto et al. |
| 2003/0171998 A1 | 9/2003 | Pujar et al. |
| 2003/0172007 A1 | 9/2003 | Helmolt et al. |
| 2003/0200150 A1 | 10/2003 | Westcott et al. |
| 2003/0208365 A1 | 11/2003 | Avery et al. |
| 2003/0229502 A1 | 12/2003 | Woo |
| 2004/0010463 A1 | 1/2004 | Hahn-Carlson et al. |
| 2004/0098358 A1 | 5/2004 | Roediger |
| 2004/0122689 A1 | 6/2004 | Dailey et al. |
| 2004/0162763 A1 | 8/2004 | Hoskin et al. |
| 2004/0172321 A1 | 9/2004 | Vemula et al. |
| 2004/0186765 A1 | 9/2004 | Kataoka |
| 2004/0186783 A1 | 9/2004 | Knight et al. |
| 2004/0210489 A1 | 10/2004 | Jackson et al. |
| 2004/0220861 A1 | 11/2004 | Morciniec et al. |
| 2004/0267674 A1 | 12/2004 | Feng et al. |
| 2005/0015303 A1 | 1/2005 | Dubin et al. |
| 2005/0055283 A1 | 3/2005 | Zarovinsky |
| 2005/0060270 A1 | 3/2005 | Ramakrishnan |
| 2005/0075915 A1 | 4/2005 | Clarkson |
| 2005/0075941 A1 | 4/2005 | Jetter et al. |
| 2005/0086122 A1 | 4/2005 | Cirulli et al. |
| 2005/0096963 A1 | 5/2005 | Myr et al. |
| 2005/0102175 A1 | 5/2005 | Dudat et al. |
| 2005/0102192 A1 | 5/2005 | Gerrits et al. |
| 2005/0102227 A1 | 5/2005 | Solonchev |
| 2005/0165659 A1 | 7/2005 | Gruber |
| 2005/0171825 A1 | 8/2005 | Denton et al. |
| 2006/0020512 A1 | 1/2006 | Lucas et al. |
| 2006/0036507 A1 | 2/2006 | Pujar et al. |
| 2006/0112099 A1 | 5/2006 | Musgrove et al. |
| 2007/0050272 A1 | 3/2007 | Godlewski et al. |

FOREIGN PATENT DOCUMENTS

| | | |
|---|---|---|
| WO | WO-99/45450 A2 | 9/1999 |
| WO | WO 01/71635 A2 * | 9/2001 |

OTHER PUBLICATIONS

U.S. Appl. No. 60/374,892, filed Apr. 22, 2002, Krajec.

Abraham et al., "An Implemented System for Improving Promotion Productivity Using Store Scanner Data", Marketing Science, Summer 1993, vol. 12, No. 3, pp. 248-269.

Anon., "(A Lot of) Life After H. Ross: Electronic Data Systems", *Financial World*, vol. 162, No. 22, Nov. 9, 1993 (p. 50(2)).

"Beyond Markdown Management", summer/autumn 03, the 4caster, Issue 4, vol. 2, 4 pages.

Brown, "The Effects of Assortment Composition Flexibility on Operating Efficiency", (Abstract Only), *Dissertation Abstracts Int'l.*, vol. 55/08-A, available at least by 1994, (p. 2458).

"Retailers Manage Markdown Challenges Using i2 Solutions", Jan. 13, 2003, NFR 92nd Annual Convention & Expo, 2 pages.

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Jensen et al., "Long-Term Construction Contracts: The Impact of Tamra '88 on Revenue Recognition", *Journal of Construction Education*, Spring 1997, vol. 2, No. 1, pp. 37-53.

Kelkar et al., Price Modeling in Standards for Electronic Product Catalogs Based on XML, 2002, pp. 366-375.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Srinivasan et al., Concepts and strategy guidelines for designing value enhancing sales promotions, Journal of Product and Brand Management, vol. 7, No. 5, 1998, pp. 410-420.

Subrahmanyan et al., "Developing optimal pricing and inventory policies for retailers who face uncertain demand", Journal of Retailing, vol. 72, No. 1, Spring, 1996, 15 pages.

Wilson, "Changing the Process of Production", *Industrial Management*, vol. 37, No. 1, Jan./Feb. 1995 (pp. 1-2).

* cited by examiner

— 702

Contract no.: 4700
LIEF_1
Valid from January 01 – March 31, 2004
Contract month (today) November 10, 2003

706, 708, 710, 711

| Item | Article no. | Description | Article Hierarchy Node | Quantity | Purchase Price |
|---|---|---|---|---|---|
| Pos_1 | SA_4721 | Shirt, check | AHK1 | 200 PC | $ 18.00 |
| Pos_2 | SA_4722 | Shirt, colored | AHK1 | 100 PC | $ 24.00 |
|  |  |  |  |  |  |

712, 714, 716, 718

— 704

OTB key:
- Article hierarchy node
  (*Karstadt* = *TM Men's clothing*) = AHK1
- Season: 01 (Spring)
- Season year: 2004

Internal ratio value:
- Quantity:      in    300    pc.
- Purchase price:   in    $ 20.00
- Value:        in    $ 6000.00

720, 730, 732, 734, 736

| Order month ---------------------- Delivery month | Contract Month November 2003 | *First Purchase Order Month* | *Second Purchase Order Month* |
|---|---|---|---|
| Jan 2004 | 100 pc $ 2000.00 |  |  |
| Feb 2004 | 100 pc $ 2000.00 |  |  |
| Mar 2004 | 100 pc $ 2000.00 |  |  |

METHOD OF AND SYSTEM FOR ALLOCATING AN OTB-RELEVANT PURCHASING CONTRACT

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND

The present description relates generally to the field of methods of and systems for purchasing retail products and/or services, and more specifically to methods of and systems for allocating a purchasing contract, such as an OTB-relevant purchasing contract, for retail products and/or services over a plurality of budgeting periods during the term of the contract.

Purchasing retail products and services from a supplier or provider typically involves sending a purchase order to the supplier requesting a specific number of items for a specific price. The number of items multiplied by the price of the items provides a total cost associated with the purchase order. Prior to sending the purchase order, the purchase order may need to be approved by an entity, such as a budgeting department. The entity may apply one or more rules, or checks, to the purchase order in determining whether to approve the purchase order. For example, a rule may dictate that the approval is granted or denied based on whether incurring the total cost of the purchase order is acceptable in view of budget constraints. Accordingly, the purchase order is approved or rejected based on budget constraints prior to being sent to the supplier.

The rules that are applied to the electronic purchase order may be any of a plurality of types of rules. For example, the rule may be a budgeting rule. Budget rules describe the amount of money available to purchase merchandise for a given time period. During a pre-season planning and buying phase, the budget rules may be used by planners and buyers to control their purchasing budget. During a seasonal phase, the budget rules may be utilized in calculating performance as the budget rules are updated based on sales activity. For example, planners and buyers may monitor the updated budget rules to determine if each category's performance is proceeding according to plan or if corrective steps, such as price reductions or stop orders, need to be taken to manage inventory.

The business of providing retail products and services can require that certain purchase orders be processed in a very short amount of time, while other purchase orders must be placed well in advance of the desired delivery. For example, changes in current trends in the fashion industry may require that inventory be increased on short notice. Additionally, fashion articles may require ordering well in advance of delivery, in some cases six months or more in advance. For certain aspects of the fashion industry, items may be required to be ordered one or more seasons in advance. Further, tracking inventory and budgets for seasonal items can be important to the profitability of business. For example, identifying a particularly fast selling item and ordering additional quantities of the fast selling item within a prescribed budget may increase the profitability of a retail location.

As part of the procurement process, providers of retail sales articles and services often enter into long-term purchasing agreements such as purchasing contracts in order to secure a supply of materials or provision of services over a certain period based on predefined conditions. For example, a provider may negotiate a central contract for an entire group of stores in order to obtain more favorable pricing conditions. Purchase orders for required quantities of retail sales articles or services may then be released against the contract throughout its duration. Accordingly, optimization of the smooth flow of the procurement process includes efficiently incorporating data from purchasing contracts.

As the term of a purchasing contract usually extends over more than one delivery or purchasing period used for budgeting purposes, the quantities or other amounts in the contract need to be distributed over each budgeting period such that purchase orders for required quantities of retail products or services may then be released against the purchasing contract throughout its duration for each distribution. In turn, a budget rule may need to be applied to the purchasing contract to determine whether sufficient funding is available or was reserved in the corresponding budget for the retail products or services.

Thus, there is need for a method of and system for allocating a purchasing contract, such as an OTB purchasing contract, which is configured for automated distribution of quantities or other amounts in the purchasing contract over several budgeting periods. There is further need for such a method and system configured for automated application of a budget rule to each distribution to determine whether sufficient funding is available or was reserved in the corresponding budget for the retail products or services.

SUMMARY

According to an exemplary embodiment, a method of allocating a purchasing contract over a temporal period associated with the purchasing contract includes receiving data regarding the purchasing contract in a computerized system, distributing the received data regarding the purchasing contract over the associated temporal period, and applying at least one rule to the distributed data to determine whether the distribution of the data regarding the purchasing contract should be accepted or rejected.

According to another exemplary embodiment, a system for allocating a purchasing contract over a temporal period associated with the purchasing contract includes means for receiving data regarding the purchasing contract, means for distributing the received data regarding the purchasing contract over the associated temporal period, and means for applying at least one rule to the distributed data to determine whether the distribution of the data regarding the purchasing contract should be accepted or rejected.

According to another exemplary embodiment, a program product for allocating a purchasing contract over a temporal period associated with the purchasing contract includes machine-readable program code for causing, when executed, one or more machines to perform the method steps of receiving data regarding the purchasing contract, distributing the received data regarding the purchasing contract over the associated temporal period, and applying at least one rule to the distributed data to determine whether the distribution of the data regarding the purchasing contract should be accepted or rejected.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and:

FIG. 7 illustrates a purchasing contract with a header-related internal contract ratio according to an exemplary embodiment.

DETAILED DESCRIPTION

In the following description, for the purposes of explanation, numerous details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments. Furthermore while the embodiments described herein refer primarily to retail products or retail sales articles, it is envisioned that the present description will be applicable to the sale of any type of product or service.

Figure 1:
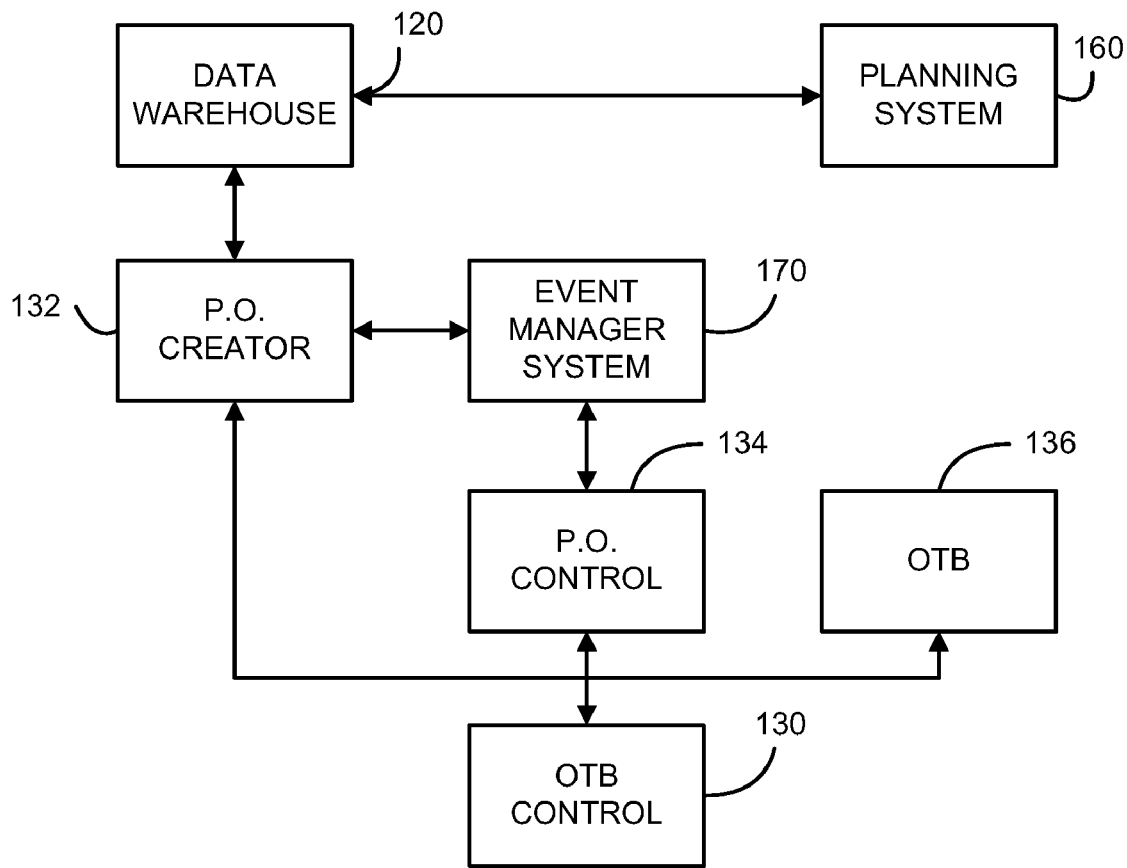
FIG. 1 is a general block diagram illustrating a system for processing data related to retail operations and planning according to an exemplary embodiment.

Referring now to FIG. 1, a general block diagram is shown illustrating an open-to-buy (OTB) system 100 for processing data related to retail operations and planning, according to exemplary embodiment. The OTB system 100 includes a data warehouse 120, a purchase order creator 132, an OTB control system 130 and a purchase order control system 134.

The OTB system 100 may be implemented as a workbench that may be a data processing system or software configured to control, display, interface with operators, or perform other operations to manage purchase orders. The OTB control system 130 is preferably implemented in an SAP-based workbench, interface, and architecture, but any other systems may be utilized.

The OTB system 100 may be implemented as a single system, a distributed system, or any combination thereof. The OTB system 100 may be implemented using a single computing system, a plurality of computing systems, software, hardware, or any other system or combination of systems to perform the functions described herein.

Data warehouse 120 is a data repository configured to receive, sort, and process information related to retail operations and planning. The data warehouse 120 may also be implemented as using a single or multiple systems. The data warehouse 120 may further include one or more functions associated with it to permit a user to efficiently organize and retrieve stored data. The OTB system 100 is sufficiently flexible to accommodate any of a variety of types of data warehouses 120, such as databases, for example.

In certain embodiments, the data warehouse 120 may be adapted to generate rules or checks to be used in the processing of purchase orders. In other embodiments, a planning system 160 may be provided to generate planning data, rules, checks and budgets, and to provide such information to the data warehouse 120. In this regard, the rules or checks may include a planning data or planning budgets including budget buckets corresponding to delivery periods and order periods, for example. The planning data or budgets are provided by the data warehouse 120 to the OTB control system 130, which may be included in a purchase order workbench.

The purchase order workbench may be a data processing system configured to allow a user to create, monitor, and receive approval for purchase orders for obtaining products or other supplies from a supplier. According to an exemplary embodiment, the purchase order creator 132, the purchase order control system 134, and the open-to-buy control system 130 are included in the workbench.

Purchase order creator 132 may be any system or method for creating electronic purchase orders. An electronic purchase order may be any type of purchase order in an electronic format. Purchase order creator 132 may include one or more functions to facilitate creation of the electronic purchase order. For example, purchase order creator 132 may include an auto fill function to automatically populate an electronic purchase order with previously stored data. Additionally, purchase order creator 132 may include a user interface configured to receive and display purchase order information with a user. Upon creation of a purchase order, the purchase order creator 132 provides the purchase order information to the data warehouse 120 for use in future planning or recalculation of planning data or budget. The purchase order information is also provided to the purchase order control system 134. An event manager system 170 may be provided to facilitate communication between the purchase order creator 132 and the purchase order control system 134. The event manager system 170 may receive commands from the purchase order control system 134 to, for example, initiate the creation of a purchase order and may process that command by issuing a command to the purchase order creator 132.

Purchase order control system 134 may be any system for controlling and monitoring electronic purchase orders. Purchase order control system 134 includes one or more functions configured to allow a user to manipulate or receive information related to any existing purchase order. For example, a user may utilize purchase order control system 134 to retrieve information related to a specific purchase order and modify one or more attributes of the retrieved purchase order.

The purchase order control system 134 provides purchase order information to the OTB control system 130, which is configured to facilitate automated approval or rejection of electronic purchase orders including both procurement and budget check functions. The OTB control system 130 receives an electronic purchase order as input and applies one or more rules to the electronic purchase order to determine whether the electronic purchase order should be approved or rejected. The rules, or checks, are based on the planning budget which is based on the planning data received from the data warehouse 120. Planning budgets or buckets may be generated from the planning data at either the data warehouse 120, the OTB control system 130 or in another module lying between the two. According to an exemplary embodiment, the one or more rules includes at least one budget rule. A budget rule may define the amount of money that is available for a purchase order based on information contained in the purchase order. For example, a purchase order may include a time frame for the purchase order, and the rule may be used to define the amount of money that is available in that time frame. According to alternative embodiments, the one or more rules may also include rules directed to the timing during which purchase orders may be requested. In other embodiments, other types of rules may be incorporated into the OTB system 100. The OTB control system 130 will be further discussed below with reference to FIGS. 2-5.

According to alternative embodiments, a purchase order workbench may further include more, fewer, or different systems to facilitate creation, processing, and maintenance of purchase orders. Further, functions associated with one or more systems may alternatively be associated with one or more alternative systems. For example, purchase order creator 132 may be implemented as a component of purchase order control system 134.

Figure 2:
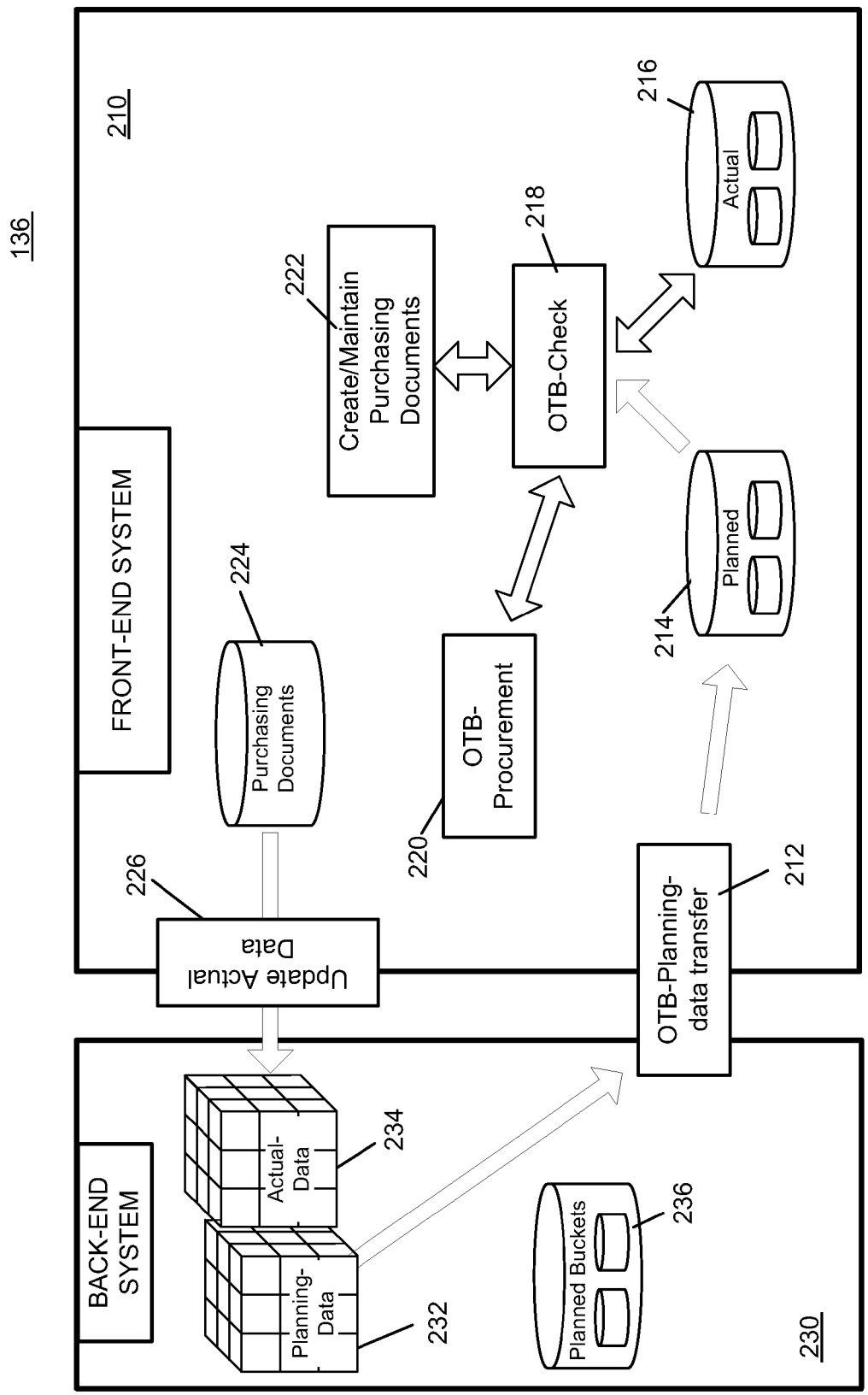
FIG. 2 is a block diagram illustrating an open to buy control system according to an exemplary embodiment.

Referring now to FIG. 2, a block diagram illustrates open to buy system 136, according to an exemplary embodiment. Open to buy system 136 includes a plurality of components configured to implement one or more functions to facilitate acceptance or rejection of an electronic purchase order. Open to buy system 136 may be implemented as a purchase order processing system as will be further discussed below with reference to FIGS. 3-5.

Open to buy system 136 includes a front-end system 210 configured to provide an interface between one or more users and a back-end system 230, according to an exemplary embodiment. Although shown as separate components, front-end system 210 and back-end system 230 may alternatively be implemented as a single system. Yet further, open to buy system 136 may include a plurality of either front-end systems 210 or back-end systems 230. For example, open to buy system 136 may include a plurality of front-end systems 210 to allow multiple users in distributed locations to access uniform and synchronized information stored on backend system 230.

Further, each of the front-end system 210 and the back-end system 230 may further be configured to each include lower-level front-end and back-end systems. In this regard, one or both of the front-end system 210 and the back-end system 230 may include components which allow user interaction and components which interface with other modules.

Front-end system 210 is configured to allow one or more users to perform a functions implemented using open to buy system 136. In the illustrated exemplary embodiment, the front-end system 2120 includes a planning-data transfer module 212 adapted to receive data from the back-end system 230. The data received may include, for example, planned budget buckets, sales and budgeting information based on prior experience, current market conditions, and other factors. Additional detail relating to the planning data and its generation is provided below with reference to the description of the back-end system 230.

The planning-data transfer module 212 may generate a budget or a set of budget buckets, or budget portions, based on the planning data received from the back-end system 230. The budget information generated can then be stored in a planned budget module 214. In other embodiments, the planning-data transfer module 212 may receive and transfer raw planning data, and the planned budget module 214 may generated the budget information. In still further embodiments, the budget information may be generated within the back-end system 230 and forwarded to the planned budget module 214 through the planning data transfer module 212.

When a purchase order is received or submitted for processing, the front-end system 210 applies a set of checks or rules to determine whether the order should be processed as submitted. In this regard, the front-end system 210 is provided with an order check module 218. The order check module 218 accesses budget information from the planned budget module 214 to perform the necessary checks.

The order check module 218 may be configured to apply one or more open to buy rules to an electronic purchase order to determine whether the electronic purchase order should be accepted or rejected. A budget rule may be a type of open to buy rule. The order check module 218 may include a currency translation function configured to convert generic financial information to specific financial information relevant to the current user of front-end system 210. Status processing function 218 may be any function configured to determine whether no check was performed, a positive check result was received or a negative check result was received.

If the order check module 218 determines that the purchase order can be processed, the order is forwarded to a procurement module 220, which may communicate, directly or indirectly, with a computer at a supplier or a vendor to place the order. The procurement module 220 may be configured to receive and process information related to the creation, modification, or cancellation of an electronic purchase order.

If, on the other hand, the order check module 218 determines that the rules do not allow the purchase order to be processed as submitted, the order, the rules, the budget or a combination thereof may be modified to allow the processing of the purchase order. The front-end system 210 may be provided with an actual budget module 216 to store budget information which may have been updated or revised by the order check module 218.

Once the order has been placed by the procurement module 220, a confirmation may be received from the supplier or vendor. The information relating to the placement of the order may be generated by a purchasing documents creation module 222. In this regard, the information may include any revisions to the purchase order required by the order check module 218. The information generated by the purchasing documents creation module 222 may then be stored in a purchasing documents data store 224. In certain embodiments, an actual data transfer module 226 may be provided to supply the actual order and budget information to the back-end system for planning purposes.

According to alternative embodiments, front-end system 210 may include more, fewer, and/or different functions to provide a user interface and perform calculations related to purchase order processing. The described functions may be implemented using hardware, software, integrated circuits or any system configured to perform the functions described herein.

Back-end system 230 is configured to process data, store data, facilitate planning, provide reporting, and provide other functions associated with purchase order management using one or more functions and/or components. The back-end system 230 includes a planning data module 232 adapted to generate a merchandise ordering plan including all planned data e.g. planned sales, planned margin, planned inventory, planned receipts and planned budget buckets. The merchandise ordering plan may include information relevant to, for example, order scheduling and budgeting. The planning data module 232 may be configured to receive information from at least an order forecasting system and an actual inventory reporting system 234. The order forecasting system (not shown) may include information from various sources, such as industry outlook reports, relating to expected market conditions, for example, The actual inventory reporting system 234 provides information to the planning data module 232 relevant to the actual inventory currently available, which may include expected deliveries. In this regard, the actual inventory reporting system 234 may include information received from the front-end system 210, through the actual data transfer module 226, relating to purchase orders already placed.

In certain embodiments, the planning data module 232 may be adapted to generate budget information. The budget information may be stored within the back-end system 230 in a transferred budget module 236. Transferred budget module 236 may be used to store planned budget buckets that have been released and or transferred to planned budget module 214 or the transferred budget module. This may be used to reduce data traffic that only the changed and new buckets are transferred from planning data module 232 and Transferred budget module 236 to planned budget module 214.

As noted above, the generation of the budget information from the planning information may be accomplished by either the planning-data module 232, the planning data transfer module 212 or the planned budget modules 214, 236. In this regard, the budget information may include a budget allocation into a plurality of budget portions, or buckets, each corresponding to, for example, a delivery period, an order period, a merchandise category or a combination thereof.

According to alternative embodiments, backend system 230 may include more, fewer, and/or different functions to provide information and perform calculations related to purchase order processing.

Calculate open to buy rule transferred budget module 236 may be a function configured to generate one or more rules or functions to be applied to an electronic purchase order to determine whether the electronic purchase order should be accepted or rejected. The generation of the one or more rules and their application to electronic purchase orders are further discussed below with reference to FIG. 5.

Front-end system 210 and backend system 230 may be associated with one or more interface calls. An interface call is a message sent between front-end system 210 and back end system 230 or within either system. The interface call may be a request for information, a request for processing, and/or a communication of data. Each interface call may be associated with one or more functions or components within open to buy system 136.

A purchase order processing interface call is a communication from front-end system 210 to back-end system 230 communicating a request for the creation, modification, and/or cancellation of a purchase order. Modifications may include changes to amounts, changes to timing information, or any other modification. Based upon receipt of an interface call, the back-end system 230 is configured to create, modify, and/or cancel a purchase order.

A calculate open to buy rule interface call is a communication from back-end system 230 to front-end system 210 including an open to buy rule to be applied to electronic purchase orders. Based upon receipt of the open to buy rule, the front-end system 210 may be configured to store the open to buy rule for application to future electronic purchase order requests in, for example, the order check module 218, which may further be configured to perform a validation check on the open to buy rule upon receipt as further described below with reference to FIG. 3.

An open to buy interface call is a communication from planned budget module 214 to order check module 218 within the back-end system 230 including planning information to be used in the generation of open to buy rules. The budget planning information may include at least planned receipts, pending purchase orders, open purchase orders, order forecasts, receipts, and the change in end of planning period inventory. The interface call may further include a transfer from the order check module 218 to the used budget module 216. The transferred information may include used budget information according to existing purchase orders.

Figure 3:
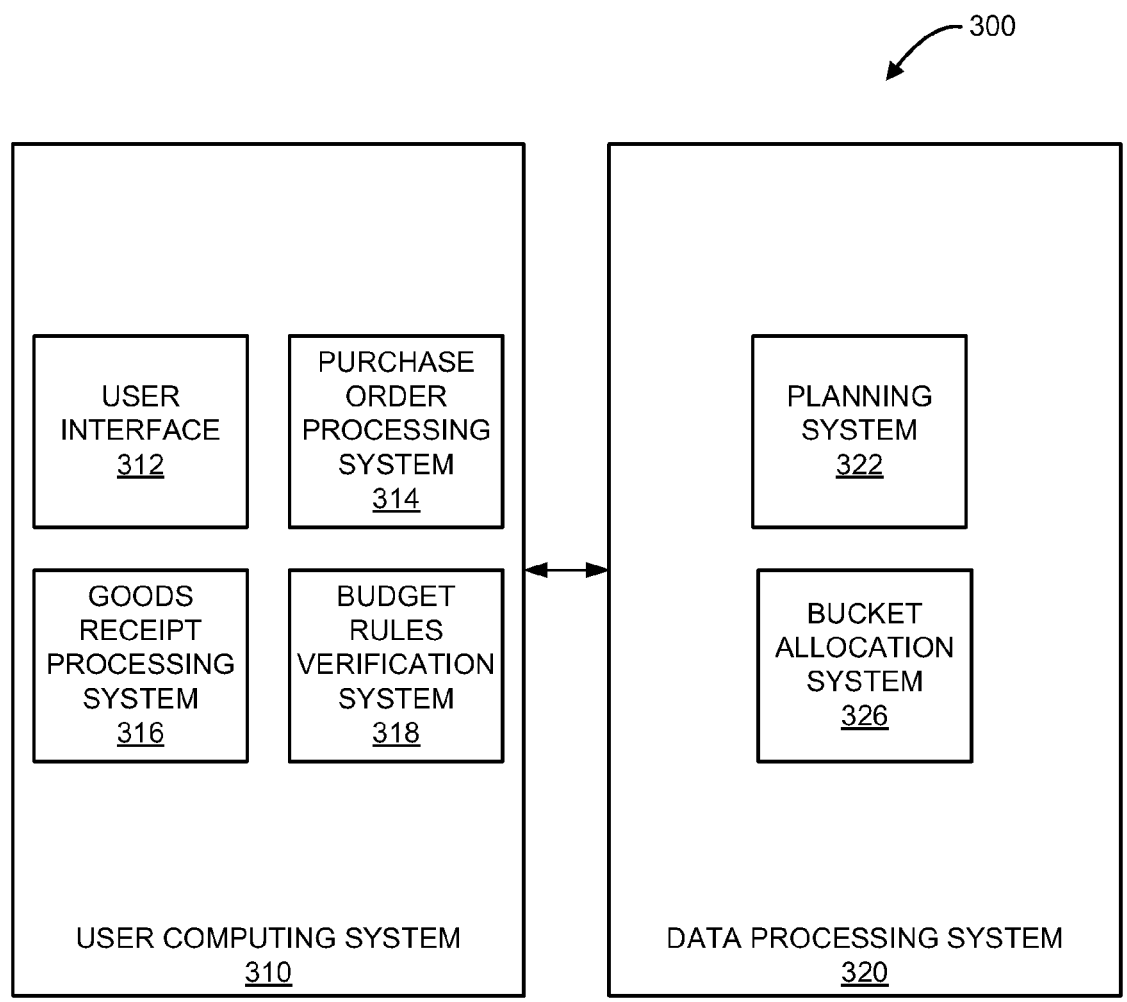
FIG. 3 is a general block diagram illustrating a purchase order processing system for processing electronic purchase orders according to an exemplary embodiment.

Referring now to FIG. 3, a block diagram illustrates a purchase order processing system 300 for processing electronic purchase orders, according to an exemplary embodiment. Purchase order processing system 300 includes a user computing system 310 and a data processing system 320. Although shown as separate systems, system 310 and system 320 may be implemented as a single system. Further, functions associated with either system 310 or system 320 may alternatively be associated with the other of system 310 or system 320 or implemented within a stand-alone system.

According to an exemplary embodiment, system 300 may be implemented using a single computing system. Accordingly, system 300 may be any type of computing device, including work stations, laptops, notebooks, personal digital assistants (PDAs), or other equipment configured to receive input, store data in a memory, execute a series of instructions, and provide an output. System 300 may include a processor configured to execute a set instructions or computer program, such as an Intel® PENTIUM® processor sold by Intel Corp. of Santa Clara, Calif.

According to an alternative embodiment, system 300 may be implemented using computing systems in a networked environment. System 300 may include a first computing system implementing user computing system 310, a communication network, and a second computing system implementing data processing system 320. The first and second computing systems may be any type of computer system, such as the computer system described above. The first and second computing systems further include devices for communicating over the communication network.

According to an exemplary embodiment, the communication network may be the Internet. According to alternative embodiments, the communication network may be any other type of network, such as a virtual private network (VPN), an Ethernet, or a Netware network. Further, the network can include a configuration, such as, a wide area network (WAN) or a local area network (LAN).

According to an alternative embodiment, system 300 may include a plurality of user computing systems 310. For example, wherein system 300 is configured to operate in a networked environment, system 300 may include multiple user computing systems 310 configured to communicate with data processing system 320 over the communication network. System 300 may further include a plurality of data processing systems 320. The data processing systems 320 may be in communication with each other such that uniform rules are provided to the user computing system 310, further discussed below with reference to FIG. 5.

User computing system 310 may be any type of system configured to allow a user to enter and receive data related to electronic purchase order processing. For example, user computing system 310 may include a user interface configured to allow a user to input details related to a purchase order request. The details may include an item to be purchased, a number of items to be purchased, a total cost of items to be purchased, a time frame for delivery of items to be purchased, a payment due date for items to be purchased, etc. An exemplary user interface 312 is further described below.

User computing system 310 may further be configured to generate or receive an electronic purchase order. An electronic purchase order may be any type of purchase order stored in an electronic format.

User computing system 310 may further be configured to provide a user with the results of an electronic purchase order processing. For example, wherein an electronic purchase order is approved, user computing system 310 may be configured to display the approval to the user. User computing system 310 may further be configured to perform additional tasks related to the approval, such as, printing out the approved purchase order, forwarding the purchase order to the target supplier, updating pending order values, modifying rules, etc. These additional tasks are discussed in further detail below with reference to FIGS. 4 and 5.

Alternatively, wherein an electronic purchase order is rejected, user computing system 310 may be configured to display the rejection to a user and present the user with choices for remedial actions based on the rejection. For example, user computing system 310 may redisplay the rejected purchase order such that the user can modify one or more attributes of the rejected purchase order and resubmit the purchase order. User computing system 310 may further provide the user with feedback based on the rejection to advise the user in making amendments to the rejected purchase order. Exemplary advice can include limitations on the number of items that can be ordered, limitations on the total cost for the purchase order, limitations on the time frame for the order, description of other pending orders, etc.

Alternatively, user computing system 310 may be configured to initiate a procurement process based upon a rejection of the electronic purchase order. Alternatively, where a purchase order is rejected, certain classes of users may be allowed to modify the budget rules such that the purchase order will be allowed. For example, a class of users may have approval to override normal budget rules in special circumstances, as will be further discussed below with reference to FIG. 5.

User computing system 310 includes a user interface 312, a purchase order approval system 314, a goods receipt logging system 316, and a budget rules verification system 318. User computing system 310 may further include additional, different, and/or fewer components and/or subsystems configured to facilitate purchase order processing.

User interface 312 may be any type of user interface configured to facilitate interaction between a user and user computing system 310 and/or data processing system 320. According to an exemplary embodiment, user interface 312 may include a plurality of selectable links configured to allow the user to access functionality provided by or through user computing system 310. User interface 312 further includes a plurality of input and output fields, the input fields configured to receive information from the user and the output fields configured to display information to the user.

Purchase order request processing system 314 is a system configured to receive purchase order information from a user through user interface 312 or another source, generate an electronic purchase order, apply at least one rule to the electronic purchase order, and provide an acceptance or rejection of the electronic purchase order to the user through user interface 312 based on the application of the rule. Accordingly, purchase order request processing system 314 may include one or more of purchase order creator 132, purchase order control system 134, and/or open to buy system 136, as discussed above with reference to FIG. 1. Budget rules and the process for accepting or rejecting an electronic purchase order are provided in more detail below with reference to FIG. 5.

Goods receipt processing system 316 is a system for processing information related to the receipt of goods for an existing electronic purchase order. According to an exemplary embodiment, goods receipt processing system 316 is configured to receive goods receipt information from a user through user interface 312 and provide the information to data processing system 320. Data processing system 320 may be configured to utilize the goods receipt information to update budget rules as will be further discussed below with reference to FIG. 4.

Budget rules verification system 318 is a system configured to receive at least one budget rule from data processing system 320 and perform a verification check on the at least one budget rules.

Data processing system 320 may be any type of system configured to generate and maintain budget rules and associated data. Data processing system 320 includes a planning system 322, a budget rules Operational Data Store (ODS) 324, and a budget rules generation system 326.

Planning system 322 is a system configured to generate and provide planning data to budget rules ODS 324 such that rules ODS 324 can store the data to be used by rules generation system 326 generating the budget rules. The planning data may be data that is generated by planning system 322 or data that is received as an input to planning system 322. For example, planning system 322 is configured to receive at least order forecast information and actual inventory information as inputs. The order forecast information is a projection predicting information related to orders to be placed in the future. The actual inventory information contains the actual inventory for the user for which the budget rules are being generated. The input information may be received in real time, periodically, based on events, and/or manually entered as needed.

Planning system 322 may further be configured to send and receive information with budget rules ODS 324. This information can also be transferred in real time, periodically, based on events, and/or as needed.

Planning system 322 is further configured to generate budget rules reports. Budget rules reports contain a variety of information related to the creation and maintenance of the budget rules. Reports may be generated and customized for a variety of uses including strategic financial planning, store planning, merchandise planning, roll-out planning, etc. The planning system 322 is adapted to re-calculate a planned budget either manually or automatically. The recalculation may be based on actual data received, for example, from previous planning cycles.

Budget rules ODS 324 is an operation data store. ODS 324 is configured to receive and store all of the information from various sources needed to generate the budget rules. ODS 324 may further store additional information such as information used by planning system 322 in generating budget rules reports.

Exemplary information stored in ODS 324 may include planned receipts, pending purchase orders, open purchase orders, order forecast, receipts, and the difference between the planned inventory at the end of the planning period and the forecast inventory at the end of the planning period. The data may be stored and searchable according to a variety of key fields such as client name, week, month, delivery period, purchasing period, season type, season year, merchandise category, rollout date, season level, assortment level, organizational level, etc. Key fields may include any data category and can be used as a filtering criteria for the data. Thus, a customer or user may filter, sort, organize or retrieve the data based on any such key fields.

According to an exemplary embodiment, data stored in ODS 324 may be stored in a planning currency. Advantageously, utilizing a planning currency allows budget rules to be created independent of volatility or differences in currency. By removing currency differences and volatility, budget rules may be more uniformly and effectively applied.

Budget rules generating logic 326 is configured to access data stored in ODS 324 to generate at least one rule. According to an exemplary embodiment, the rule may be a budget rule. According to an exemplary embodiment, the at least one budget rule is a limit based on the amount of money available to purchase merchandise for a given time period. The creation of the at least one budget rule is further discussed below with reference to FIG. 4.

Data processing system 320 may further include more, fewer, or different configurations of subsystems and/or functions to perform the functions described herein. For example, data processing system 320 may include an inventory tracking system to facilitate generation of budget rules. Further, systems or function described as associated with a particular system or subsystem of system 100 may alternatively be associated with any other system within system 100. For example, budget rule calculations may alternatively be performed within data processing system 320.

Figure 4:
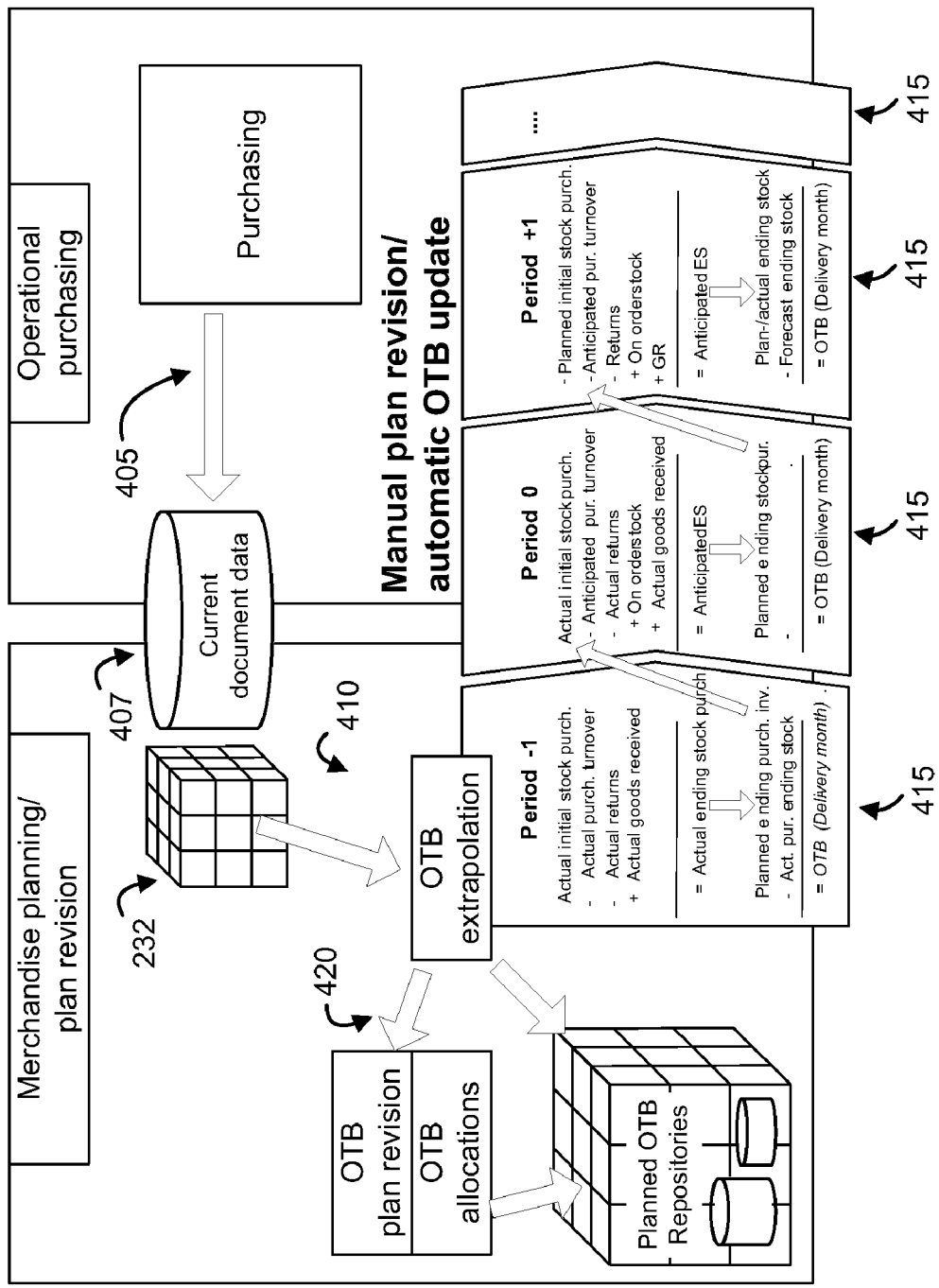
FIG. 4 is a flowchart illustrating a method for creating a budget rule according to an exemplary embodiment.

Referring now to FIG. 4, a block diagram 400 is shown illustrating a method for creating one or more budget rules according to an exemplary embodiment. The budget rules may be created by budget rules generating logic 326 using data stored in ODS 324 or from any other source.

In a step 405, data is received from a purchasing department indicating a contract to be associated with the budget rules. The specific contract may included in current document data 407 transferred to planning data module 232 and be directed to a particular retailer, a particular supplier, a particular merchandise line, etc. The budget rules will be generated based upon data associated with the specific contract.

In a step 410, a set of budget rules is generated based on the received current document data including the indication of the contract associated with the business rules. For example, the budget rules may be generated based on a remaining budget that is available based on current factors such as actual purchase turnover, actual returns, actual goods received, etc. The budget rules may further be generated based on any other factors. For example, determination may be made whether the budget rule is to be created to apply to purchase orders received during a planning and buying phase or to purchase orders received during an in-season or selling phase. According to alternative embodiment, further alternatives may be provided to modify to scope and/or focus of the budget rules to be created. For example, budget rules may also be created to apply to specific stores, specific merchandise, etc.

In a step 415, new budget rules or modifications to existing budget rules are calculated for a sub-period within a planning period. A sub-period may be a week, a month, a year or any other time period within a planning period. Alternatively, budget rules may be calculated to apply to the entire period.

According to an exemplary embodiment, the budget rules are limits equal to the values of planned receipts minus pending purchase orders minus open purchase orders minus forecasted purchase orders minus receipts. The values are generally obtained by accessing data stored with ODS 324. The budget rules are roughly equivalent to the inflows minus all outflows for a sub-period. The amount remaining is the amount that is available to purchase merchandise for the sub-period.

Following calculation of the budget rules for the sub-period, the sub-period may be incremented to create a set of budget rules for the next period within the planning period and step 415 may be repeated. This iterative step may be repeated for each sub-period within the planning period to create a set of budget rules.

Following generation of the one or more budget rules, the rule or set of rules may be transferred from data processing system 320 to user computing system 310 in a step 420. The budget rules may be transferred periodically, based upon receipt of a purchase order, based on a detected change in one or more budget rules, based on manual inputs, etc. In some embodiments, the budget rules for one or more delivery periods may occur well into the future. As noted above, the system allows for recalculation of the planned budget either manually or automatically.

The result of the calculation may be allocated to different order periods. For example, a set of budget rules that are calculated for a first period in step 415 may be associated with a first period, while a second iteration of step 415 is associated with a second period, etc.

Figure 5:
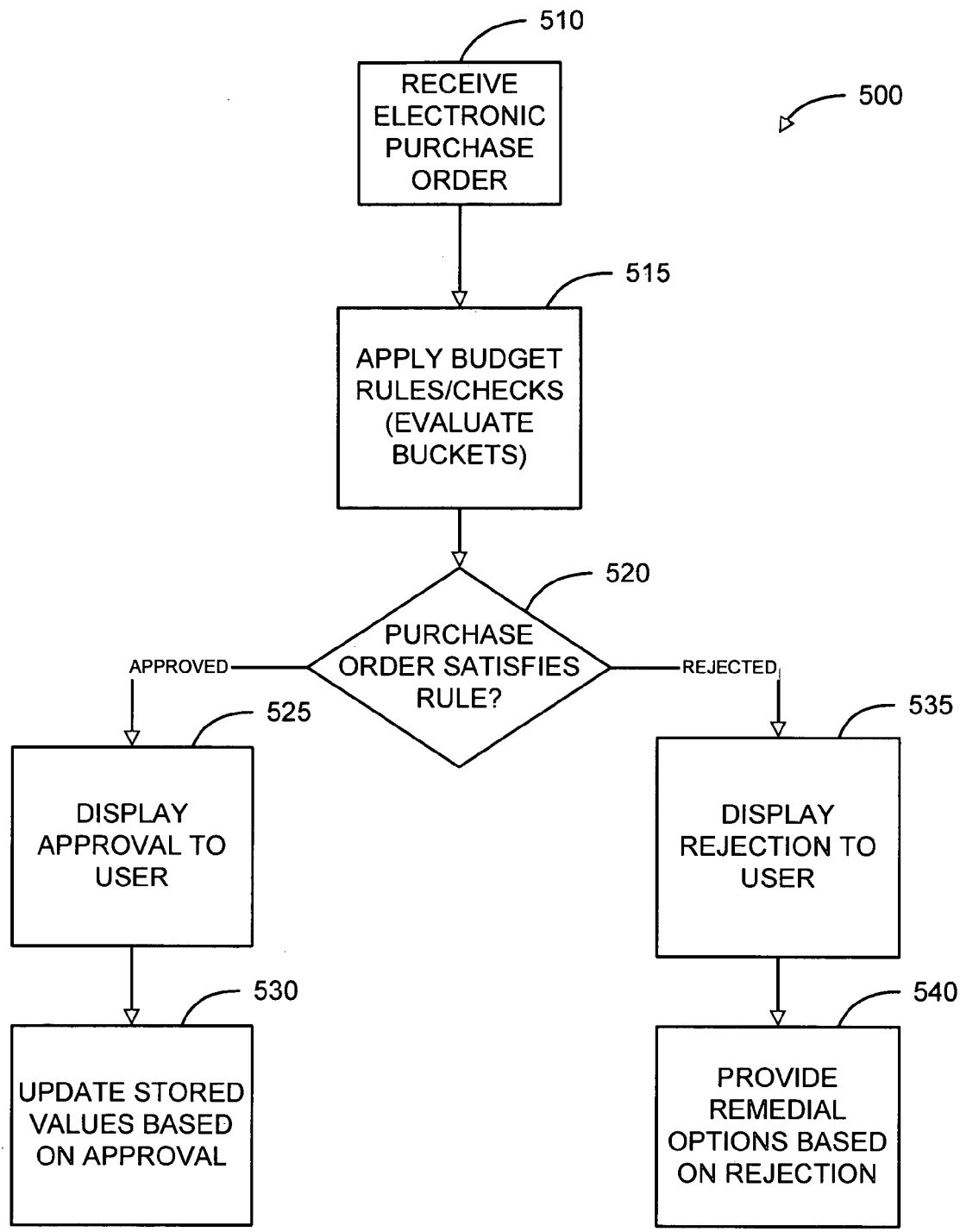
FIG. 5 is a flow chart illustrating a method for processing electronic purchase orders according to an exemplary embodiment.

Referring now to FIG. 5, a flow chart 500 illustrating a method for processing electronic purchase orders is shown according to an exemplary embodiment. Electronic purchase orders are processed by applying one or more rules to the electronic purchase order to determine whether the purchase order is allowable according to the rules.

In a step 510, an electronic purchase order is received. The electronic purchase order for a sub-period may be received based upon user input through user interface 312 as described above. Alternatively, the electronic purchase order may be automatically generated. For example, the method for processing purchase orders may be used in conjunction with an inventory management system configured to automatically create purchase orders based on levels of inventory, changes in inventory, etc.

In a step 515, one or more budget rules are applied to the purchase order. Applying one or more budget rules to the purchase order may include subtracting the total cost under the purchase order from the amount of money available for purchasing to determine whether the total cost is less than the amount of money available. In case of OTB allocation of planned budgets the order period and delivery period have to get determined/accessed. Following application of the one or more rules, a determination is made in step 520 whether the total cost of the purchase order is less than the amount of money available.

If the total cost of the purchase order is less than the amount of money available, the purchase order is approved in a step 525. Approval of the purchase order includes displaying an indicia to the user through user interface 222 to indicate that the purchase order is approved. Following approval of the purchase order, it may be necessary to update used budget module 216 in a step 530. In particular, the pending orders for the particular sub-period described in the purchase order are increased by an amount equal to the total cost of the purchase order.

Approval of the order may also include providing the user with the option to take one or more additional steps. For example, the user may be provided with an option to automatically forward the approved purchase order to the supplier for which the purchase was generated.

If the total cost of the purchase order is more than the amount of money available, the purchase order is rejected in a step 535. Rejection of the purchase order includes displaying an indicia to the user through user interface 222 to indicate that the purchase order is rejected and is generally accompanied by the reason for the rejection. For example, in some embodiments, the placement of a purchase order may require the existence of a budget bucket for the corresponding delivery period and order period. If no such bucket exists or the bucket has insufficient funds, the indicia may include a message such as "NO BUCKET FOR REQUESTED ORDER."

Following rejection of the purchase order, the user may be provided with one or more options based upon the rejection in a step 540. For example, the user may be provided with an opportunity to amend the purchase order such that the purchase order will be accepted with procurement module 220. Further, system 300 may be configured to provide the user with feedback indicating an allowable purchase order amount.

Alternatively, wherein a user has permission to modify the budget rules, the user may be provided with an option to modify one or more of the rules such that the purchase order will be allowed. System 300 may further include constraints on a user's ability to modify the rules. For example, system 210 may include logic dictating that the user will only be allowed to modify rules for a first sub-period based upon a correlating change to a second sub-period. For example, a user may be able to increase the amount of money available in the first sub-period by decreasing the amount available in the second sub-period.

Purchase order processing may further include processing modifications and/or cancellations of existing purchase orders. Modifications that increase existing purchase order amounts may be processed as described above with the amount of the increase in the existing purchase order being treated as a new purchase order for that amount. Modifications to existing purchase order and/or cancellations of existing purchase orders may be processed without requiring approval or rejection. The budget rules may be modified to increase the amount of money available based upon a decrease or cancellation.

Although described in the context of purchase order processing for retail operations, system 210 may alternatively be applied to any system for processing electronic purchase orders by applying one or more rules to an electronic purchase order.

Figure 6:
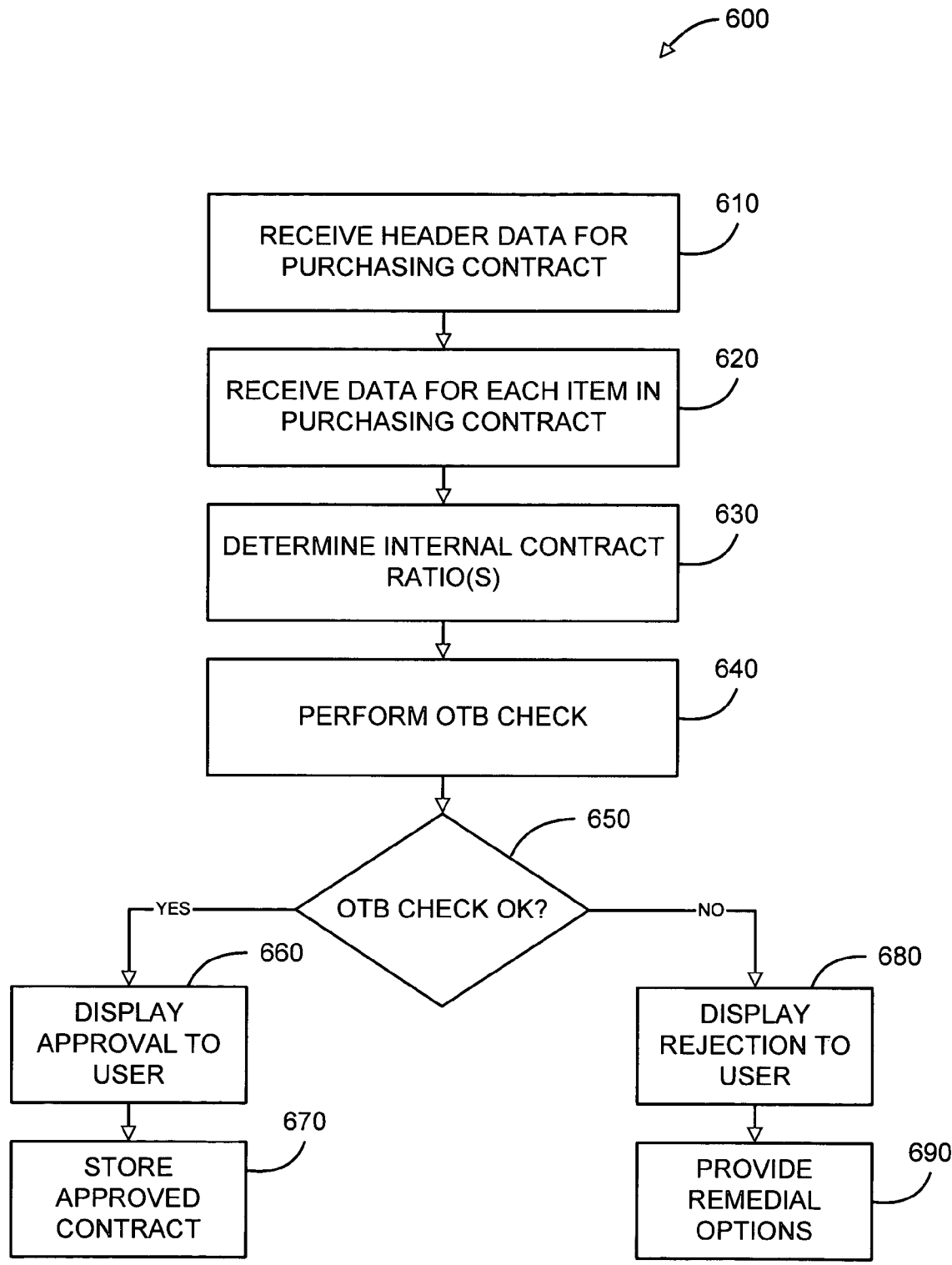
FIG. 6. is a flow chart illustrating a method of allocating a purchasing contract over a plurality of budgeting periods according to an exemplary embodiment.

FIG. 6 illustrates a method 600 of allocating a purchasing contract over a plurality of budgeting periods according to an exemplary embodiment. In this embodiment, the purchasing contract may be an "OTB-relevant purchasing contract." The term "OTB-relevant purchasing contract" as used herein refers to a contract that must be subjected to a budget rule (e.g., an "OTB check") whenever it is created and/or modified. Because the term of the contract usually extends over more than one budgeting period (e.g., delivery periods, purchase order periods, etc.), various quantities, terms, and values may need to be distributed to the budgeting periods within the term of the contract before the OTB check is performed.

The method begins with step 610. In step 610, header data is received for a purchasing contract. According to an exemplary embodiment, header data may include a supplier for retail products and/or services in the contract, a purchasing document type, a purchasing organization, a purchasing group, a start date for the term of the contract, and an end date for the term of the contract. In other embodiments, additional, less or different header data may be included. According to an exemplary embodiment, the header data for a purchasing contract is entered by a user via a graphical user interface.

The purchasing document type is an identifier which may be used to differentiate between various forms of purchasing documents and to determine the attributes of each form of purchasing document. For example, according to an exemplary embodiment, the purchasing document type may be used to differentiate between purchasing contracts for which an OTB check is to be applied at creation of the purchasing contract, and purchasing contracts for which a budget rule is applied only when a purchase order referencing the purchasing contract is released. According to an exemplary embodiment, the purchasing document type for an OTB-relevant purchasing contract indicates that an OTB check is to be applied at creation of the OTB-relevant purchasing contract.

The purchasing document type may also be used to differentiate between purchasing contracts for which a budget rule is applied to the contract based on header data for the contract, and purchasing contracts for which a budget rule is applied based on data for individual products and/or services in the purchasing contract. According to an exemplary embodiment, a header-specific purchasing document type may be assigned to purchasing contracts for a fixed quantity of items (e.g., a quantity contract) wherein the specific details of items to be purchased against the purchasing contract are not determined when the purchasing contract is created. For example, a header-specific purchasing document type may be assigned to a quantity contract for 3000 cashmere sweaters, wherein the exact quantities of crew neck, V-neck, and polo neck cashmere sweaters to be procured is not determined, but are currently estimated at 800 crew neck, 1000 V-neck, and 1200 polo neck cashmere sweaters. According to another exemplary embodiment, all of the items in the contract must have the same unit of measure (e.g., piece, carton, etc.) and must reference the same budget in order for a header-specific purchasing document type to be assigned. According to another exemplary embodiment, a header-specific purchasing document type is always assigned to purchasing contracts for a fixed value of items (e.g., a value contract).

According to an exemplary embodiment, an item-specific purchasing document type may be assigned to contracts wherein the specific items to be purchased have been determined in the contract at the time of creation. For example, an item-specific purchasing document type may be assigned to a quantity contract for 3000 cashmere sweaters, wherein the exact quantities of 800 crew neck, 1000 V-neck, and 1200 polo neck cashmere sweaters are determined in the purchasing contract. According to another exemplary embodiment, an item-specific purchasing document is assigned to a contract whenever the specific items to be purchased have been determined in the contract at the time of creation, or when the contract does not refer to a single uniform budget for all items.

According to an exemplary embodiment, the start and end of the contract term is specified based on a season. A season is a temporal reporting period in which a particular grouping of retail products and/or services is merchandised and maintained in a particular way. Exemplary seasons may include, for example, winter, spring, summer, fall, Easter, Christmas, etc.

In step 620, data is received for each item (e.g., each retail product or service) in the purchasing contract. According to an exemplary embodiment, data for each item in the purchasing contract may include an identifier for each item, a quantity and unit of measure for each item, a purchase price for each item, and a retail site for each item. In other embodiments, additional, less, or different item data may be included. According to an exemplary embodiment, the item data for a purchasing contract is entered by a user via a graphical user interface.

In step 630, one or more internal contract ratios are determined. The internal contract ratio may be used to allocate or otherwise distribute the quantities and/or values in the purchasing contract over a plurality of budgeting periods (e.g., delivery periods, purchase order periods, etc.). According to an exemplary embodiment, the internal contract ratio is not communicated to the supplier and is only used for an OTB check as described below.

According to an exemplary embodiment, data regarding the internal contract ratio may be entered manually by a user via a graphical user interface when the contract is created. According to another exemplary embodiment, manual entry of data regarding the internal contract ratio may be skipped if it is already specified (e.g., using an automated customizing function for OTB-relevant contracts). Data regarding the internal contract ratio may include, for example, an identifier for an associated grouping of retail products and/or services (e.g., an article hierarchy node such as a theme module node), a season and year (e.g., spring 2004), a purchase order period, and/or a delivery period. The data regarding the internal contract ratio may be used, for example, to identify a corresponding budget for the purchasing contract. According to an exemplary embodiment, a key field (e.g., an OTB key) is determined for each data entry in order to identify a corresponding budget for the purchasing contract. According to another exemplary embodiment, if the site is a key field for the OTB budget, the contract is always required to have a site reference maintained at item level.

Based on the purchasing document type assigned to the purchasing contract, the internal contract ratio may be defined at the header level of the purchasing contract, or at item level. According to an exemplary embodiment, where the internal contract ratio is defined at the header level of the purchasing contract, only one internal contract ratio is assigned to the purchasing contract, and all quantities of all items in the purchasing contract are distributed over the single internal contract ratio. For purchasing contracts where the internal contract ratio is defined at the item level of the purchasing contract, a separate internal contract ratio may be defined for each item.

The quantities and values to be distributed by the internal contract ratio over budgeting periods during the term of the contract are determined from the quantities and units of measure, and the purchasing prices entered in step 620. According to an exemplary embodiment, the quantities and values to be distributed over budgeting periods during the term of the contract are determined from each item in the contract where the internal contract ratio is defined at the item level of the purchasing contract, and are determined for the overall contract for contracts where the internal contract ratio is defined at the header level. For example, for a contract where an internal contract ratio is defined at the item level for each item, the value of the contract for each item is the quantity of the item from step 620 multiplied by the purchase price of the item from step 620. Alternatively, according to an exemplary embodiment, the value of a contract with an internal contract ratio determined at the header level may be determined according to:

$$V_C = \sum_{i=1}^{n} Q_i \cdot P_i = Q_C \cdot P_C \text{ with} \quad (1)$$

$$Q_C = \sum_{i=1}^{n} Q_i \text{ and} \quad (2)$$

$$P_K = \frac{\sum_{i=1}^{n} P_i \cdot Q_i}{\sum_{i=1}^{n} Q_i} \quad (3)$$

where $V_C$ is the contract value, n is the number of items, $Q_i$ is the quantity of each item i, and $P_i$ is the purchase price for each item i. $Q_C$ represents the entire quantity of n contract items and $P_C$ is their average price. Accordingly, for purposes of the internal contract ratio, the entire purchasing contract may be handled as a contract of value $V_C$ for a single item having a quantity $Q_C$ and a price $P_C$.

For each internal contract ratio, the term of the purchasing contract is determined from the header data in step 610, and is divided into a plurality of budgeting periods (e.g., purchase order periods and delivery periods in months). For example, according an exemplary embodiment, if an OTB allocation table is used, the internal contract ratio can be distributed by ordering month. Once the term of the contract is divided into budgeting periods, the quantities and values for each internal contract ratio may be distributed across each budgeting period. Each distributed quantity and value represents the quantity and value of the purchasing contract which purchase orders may potentially be released against for a particular budgeting period, pending the OTB check of step 640. According to an exemplary embodiment, the quantities and values for each internal contract ratio may be equally distributed across each budgeting period based on an automated distribution function. According to other embodiments, other distribution functions or algorithms may be used.

FIG. 7 illustrates a purchasing contract 702 with a header-related internal contract ratio 704 according to an exemplary embodiment. Purchasing contract 702 has a term 706 of three months as defined by a start date 708 of Jan. 1, 2004 and an end date 710 of Mar. 31, 2004. A contract month 711 corresponds to the date of creation of the contract. Purchasing contract 702 includes items 712 and 714. Items 712 and 714 each have an associated quantity and unit of measure 716, and a purchase price 718.

Internal contract ratio 704 is assigned to purchasing contract 702 at the header level. Because internal contract ratio 704 is assigned at the header level according to the purchasing document type of purchasing contract 702, internal contract ratio 702 is the only internal contract ratio assigned to purchasing contract 702. Internal contract ratio 704 includes a number of OTB keys 720, such as article hierarchy node "AHK1," season "Spring," and year "2004," which may be used to determine the appropriate budget for purchasing contract 702.

Because internal contract ratio 704 is assigned at the header level, the quantities and values for internal contract ratio 704 are determined for the overall contract 702. For example, in the illustrated embodiment, an internal ratio value 730 includes a quantity 732 of 300 pieces, which is the sum of the 200 pieces of item 712 and the 100 pieces of item 714 according to Eq. (2). Internal ratio value 730 also includes a purchase price 734 of $20.00 according to Eq. (3). Internal ratio value 730 further includes a contract value 736 of $6000.00 according to Eq. (1).

In the illustrated embodiment, the three month term 706 of purchasing contract 702 is divided into three delivery periods (i.e., budgeting periods) 740, 742, and 744, which correspond to January 2004, February 2004, and March 2004 respectively. In the illustrated embodiment, internal ratio value 730 is distributed evenly across delivery periods 740, 742, and 744 such that 100 pieces at a total value of $2000.00 are assigned to each period. Accordingly, purchase orders of up to $2000.00 for up to 100 pieces of items 712 and 714 may potentially be released against purchasing contract 702 for each delivery period, pending an OTB check.

Figure 8:
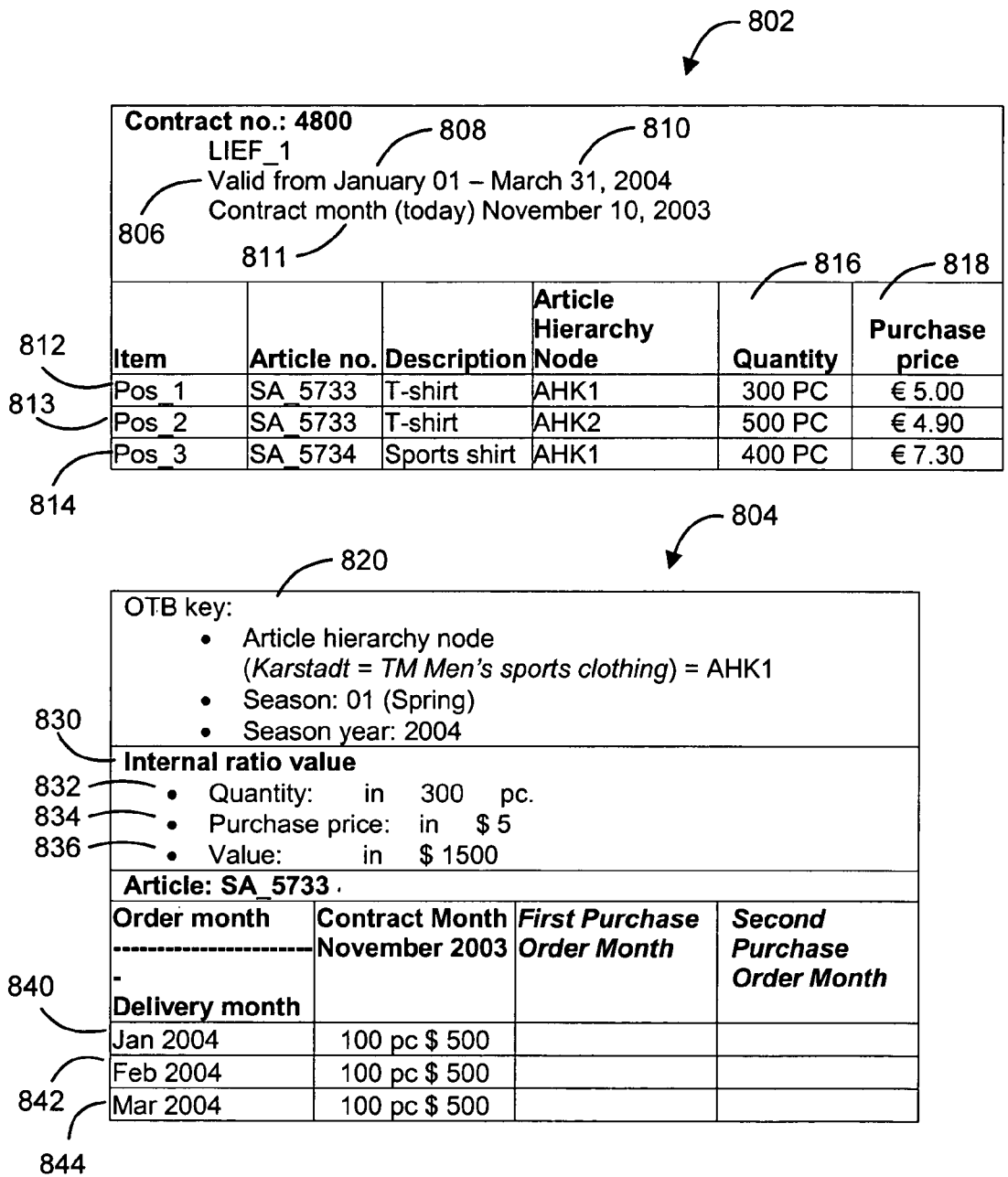
FIG. 8 illustrates a purchasing contract with an item-related internal contract ratio according to an exemplary embodiment.

FIG. 8 illustrates a purchasing contract with an item-related internal contract ratio according to an exemplary embodiment. Purchasing contract 802 has a term 806 of three months as defined by a start date 808 of Jan. 1, 2004 and an end date 810 of Mar. 31, 2004. A contract month 811 corresponds to the date of creation of the contract. Purchasing contract 802 includes items 812, 813, and 814. Items 812, 813, and 814 each have an associated quantity and unit of measure 816, and a purchase price 818.

Internal contract ratio 804 is generally assigned to purchasing contract 802 at the item level, and specifically to item 812. Because internal contract ratio 804 is assigned at the item level according to the purchasing document type of purchasing contract 802, internal contract ratio 802 is not the only internal contract ratio which may be assigned to purchasing contract 802. Separate internal contract ratios may also be assigned to items 813 and 814. Internal contract ratio 804 includes a number of OTB keys 820, such as article hierarchy node "AHK1," season "Spring," and year "2004," which may be used to determine the appropriate budget for purchasing contract 802.

Because internal contract ratio 804 is assigned at the item level, the quantities and values for internal contract ratio 804 are determined only for corresponding item 812 in contract 802. For example, in the illustrated embodiment, an internal ratio value 830 includes a quantity 832 of 300 pieces, which is taken from the quantity 816 shown for item 812 in purchasing contract 802. Internal ratio value 830 also includes a purchase price 834 of $5.00 which is taken from the purchase price 818 shown for item 812 in purchasing contract 802. Internal ratio value 830 further includes a contract value 836 of $1500.00, which is equal to quantity 832 multiplied by purchase price 834.

In the illustrated embodiment, the term 806 of purchasing contract 802 is divided into three delivery periods (i.e., budgeting periods) 840, 842, and 844, which correspond to January 2004, February 2004, and March 2004 respectively. In the illustrated embodiment, internal ratio value 830 is distributed evenly across delivery periods 840, 842, and 844 such that 100 pieces at a total value of $500 are assigned to each period. Accordingly, purchase orders of up to $500.00 for up to 100 pieces of item 812 may potentially be released against purchasing contract 802 for each delivery period, pending an OTB check.

Referring again to FIG. 6, in step 640 a budget rule may be applied to the purchasing contract in the form of an OTB check. The OTB check is performed in order to determine whether sufficient funding is available or was reserved in a budget corresponding to the purchasing contract. For example, the OTB check may include subtracting the contract value for each budgeting period in the internal contract ratio from the amount of money available in a corresponding budget for each budgeting period to determine whether the total cost for items in the purchasing contract is less than the amount of money available over the term of the purchasing contract.

According to an exemplary embodiment, the purchasing document type in the header of the contract determines whether the OTB check in step 640 is to be applied during the creation of the contract. In this embodiment, the OTB check of step 640 is performed during the creation of the contract for those purchasing contracts for which the purchasing document type in the header indicates an OTB check is to be applied when the contract is created. Otherwise, an OTB check is applied only when a purchase order referencing the purchasing contract is released.

According to an exemplary embodiment, where the internal contract ratio is defined at the header level of the purchasing contract based on the purchasing document type, an OTB check is performed for the header-level internal contract ratio using a budget key from the internal contract ratio. For example, referring again to FIG. 7, budget key 720 includes the article hierarchy node "AHK1" for Men's clothing, the season "Spring," and the season year "2004." Accordingly, an OTB check for internal contract ratio 704 may be performed in step 640 with reference to a budget associated with men's clothing in article hierarchy node AHK1 for spring 2004. In this example, the OTB check is performed for delivery periods 740, 742, and 744. For example, the corresponding budget for men's clothing in article hierarchy node AHK1 for spring 2004 will be checked for January 2004, February 2004, and March 2004 to verify that $2000.00 is available in each delivery period for releasing purchase orders against purchasing contract 702 for quantities of items 712 and/or 714.

Continuing with the embodiment, where the internal contract ratio is defined at the item level of the purchasing contract based on the purchasing document type, an OTB check is performed for the item-level internal contract ratio using a budget key from the internal contract ratio. For example, referring again to FIG. 8, budget key 820 includes the article hierarchy node "AHK1" for Men's clothing, the season "Spring," and the season year "2004." Accordingly, an OTB check for internal contract ratio 804 may be performed in step 640 with reference to a budget associated with men's clothing in article hierarchy node AHK1 for spring 2004. In this example, the OTB check is performed for delivery periods 840, 842, and 844. For example, the corresponding budget for men's clothing in article hierarchy node AHK1 for spring 2004 will be checked for January 2004, February 2004, and March 2004 to verify that $500.00 is available in each delivery period for releasing purchase orders against purchasing contract 802 for item 812. In this embodiment, an OTB check is also performed in a similar fashion for separate internal contract ratios assigned to other items in the purchasing contract. For example, in this embodiment, an OTB check would also be performed in step 640 for internal contract ratios created for items 813 and 814.

In step 650, a determination is made whether the total cost associated with the purchasing contract is less than the amount of funding available. According to an exemplary embodiment, where the internal contract ratio is defined at the header level of the purchasing contract, the OTB check is successful if sufficient funding is available in a corresponding budget for all budgeting periods in the internal contract ratio, and the OTB check fails if sufficient funding is not available for any one of the budgeting periods. For example, referring again to FIG. 7, if $2000.00 is available in a budget associated with men's clothing in article hierarchy node AHK1 for spring 2004 for each of delivery periods 740, 742, and 744, the OTB check will be successful. Alternatively, if $2000.00 is not available in a budget associated with men's clothing in article hierarchy node AHK1 for spring 2004 for, for example, delivery period 740, the OTB check will not be successful.

Continuing with the embodiment, where the internal contract ratio is defined at the item level of the purchasing contract, the OTB check is successful if sufficient funding is available in a corresponding budget for all budgeting periods in each internal contract ratio defined for an item in the purchasing contract, and the OTB check fails if sufficient funding is not available for any one of the budgeting periods for any of the items in the purchasing contract. For example, referring again to FIG. 8, if $500.00 is available in a budget associated with men's clothing in article hierarchy node AHK1 for spring 2004 for each of delivery periods 840, 842, and 844, and if sufficient funding is available for all other item-related internal contract ratios associated with the purchasing contract, the OTB check will be successful. Alternatively, if $500.00 is not available in a budget associated with men's clothing in article hierarchy node AHK1 for spring 2004 for, for example, delivery period 840, the OTB check will not be successful.

If the total cost associated with the purchasing contract is less than the amount of funding available, the purchasing contract is approved in step 660. According to an exemplary embodiment, approval of the purchase order includes displaying an indicia to a user through user interface 312 (shown in FIG. 3) to indicate that the purchasing contract is approved. In this embodiment, approval of the purchasing contract also includes storing the approved purchasing contract in step 670. The defined internal contract ratio is also saved in the database with the validity for each budgeting period. According to an exemplary embodiment, the defined internal contract ratio is also saved in the database with the validity for each delivery period, and optionally for each purchase order period, and is subdivided further into open OTB-checked contract amounts and deducted OTB-checked contract amounts (which will be equal to zero deductions at the time the contract is created and stored). Purchase orders may then be subsequently released against the purchasing contract.

If the total cost associated with the purchasing contract is more than the amount of funding available, the purchasing contract is rejected in a step 680 and is not created. According to an exemplary embodiment, rejection of the purchasing contract includes displaying an indicia to the user through user interface 312 (shown in FIG. 3) to indicate that the purchasing contract is rejected.

Following rejection of the purchasing contract, the user may be provided with one or more options in a step 690. According to an exemplary embodiment, the user may be provided with an opportunity to amend the entire purchasing contract such that it will be accepted. For example, the user may be provided with an opportunity to amend the internal contract ratio. According to other embodiments, other options may be available.

Processing purchasing contracts may further include processing modifications and/or cancellations of existing purchasing contracts. According to an exemplary embodiment, modifications that increase the requirements of an existing purchasing contract may be processed as described above with the amount of the increase in the existing purchasing contract being subject to an OTB check. For example, according to an exemplary embodiment, an existing purchasing contract may be modified by changing the internal contract ratio such that the contract value is increased. In this embodiment, the amount of the increase in the contract value is subject to an OTB check. The modification to the contract value will be implemented if the OTB check is successful.

Purchase orders for retail products and services may be released against an approved purchasing contract. Purchase orders may be released against an existing purchasing contract for amounts up to the quantities or values in the relevant internal contract ratio without an OTB check. According to an exemplary embodiment, if the amount of the purchase order exceeds the quantities or values in the relevant internal contract ratio, the purchase order is not created and an error message is generated via user interface 312 (shown in FIG. 3). According to another exemplary embodiment, an internal contract ratio associated with the purchasing contract may be automatically modified to permit the purchase order. According to another exemplary embodiment, an internal contract ratio associated with the purchasing contract may be manually modified followed by subsequent creation of the purchase order.

According to yet another exemplary embodiment, if the amount of the purchase order exceeds the quantities or values in the relevant internal contract ratio, an OTB check is performed for the amount of the purchase order which exceeds the quantities or values in the relevant internal contract ratio. For example, referring again to FIG. 7, if a purchase order for 150 pieces is initiated for delivery period 740, an OTB check is performed for the additional 50 pieces and a price of $20.00 each. If the OTB check is successful, the purchase order is approved for the entire 150 pieces. If the OTB check fails, the entire purchase order is rejected, pending available remedial options for the purchase order as described above.

According to yet another exemplary embodiment, quantities or values in an internal contract ratio for which purchase orders have not been released may be transferred from a previous budgeting period to a current or future budgeting period. For example, referring again to FIG. 7, if purchase orders for some or all of the $2000.00 value or 100 pieces allocated to delivery period 740 (i.e., January 2004) were not released, and the current delivery period is February 2004, some or all of the $2000.00 value or 100 pieces allocated to delivery period 740 may be allocated to delivery period 742 and/or delivery period 744. According to an exemplary embodiment, this allocation may automatically be performed. Once quantities or values in an internal contract ratio for which purchase orders have not been released are transferred from a previous budgeting period to a current or future budgeting period, an OTB check is performed. If the OTB check is successful, the transfer is approved. If the OTB check fails, remedial options may be presented to the user, such as further modification of the internal contract ratio.

Embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

In some instances, the embodiments disclosed herein may be implemented by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented method of allocating data regarding purchasing contracts over temporal periods associated with the purchasing contracts, the method comprising:

receiving, at an open-to-buy (OTB) system, first data regarding a first purchasing contract in a computerized system, the first data being received from a user interface, wherein the OTB system and the user interface are implemented using computer-executable instructions executable by a processor and stored on at least one computer-readable medium;

receiving, at the OTB system, second data regarding a second purchasing contract, the second data being received from the user interface;

distributing, using the OTB system, the received first data regarding the first purchasing contract and the second data regarding the second purchasing contract over the associated temporal periods;

applying, using the OTB system, at least one rule to the distributed data to determine whether the distribution of the data regarding the first purchasing contract and the second purchasing contract should be accepted or rejected;

determining, using the OTB system, a first cost of the first purchasing contract based on a third data regarding the temporal periods associated with the first purchasing contract;

comparing, using the OTB system, a first budget to the first cost;

verifying, using the OTB system, the first purchasing contract based on the first budget exceeding the first cost;

determining, using the OTB system, a second cost of the second purchasing contract based on a fourth data regarding the temporal periods associated with the second purchasing contract;

comparing, using the OTB system, a second budget to the second cost;

verifying, using the OTB system, the second purchasing contract based on the second budget exceeding the second cost; and storing in a database at least one of the first purchasing contract, the second purchasing contract, the first cost, and the second cost;

wherein verifying the first purchasing contract based on the first budget exceeding the first cost occurs at the creation of the first purchasing contract based on a first identifier of the first purchasing contract;

wherein verifying the second purchasing contract based on the second budget exceeding the second cost occurs when a purchase order referencing the second purchasing contract is released based on a second identifier of the second purchasing contract.

2. The method of claim 1, wherein the first budget comprises at least a first period budget and a second period budget.

3. The method of claim 2, wherein the first purchasing contract comprises a third purchasing contract and a fourth purchasing contract, wherein the method further comprises verifying the third purchasing contract based on increasing the first period budget by a value and decreasing the second period budget by the value.

4. The method of claim 1, further comprising transmitting at least one of a first purchasing order and a second purchasing order based on at least one of verifying the first purchasing contract and verifying the second purchasing contract.

5. The method of claim 1, further comprising generating a strategic financial planning report and at least one of a store planning report, a merchandise planning report, and a roll-out planning report.

6. The method of claim 1, wherein a first budget currency is converted into a planning currency.

7. The method of claim 1, wherein the first budget is based on a product.

8. The method of claim 7, wherein the second budget is based on a store.

9. The method of claim 1, further comprising generating a purchase order based on the distributed data for each temporal period.

10. The method of claim 1, wherein the at least one rule is a budget rule.

11. The method of claim 10, wherein applying the at least one rule to the distributed data includes generating the rule based on a budget associated with the distributed data.

12. The method of claim 11, wherein applying the at least one rule to the distributed data includes comparing at least one of the first cost and the second a-cost to an amount of available funding in the associated budget.

13. The method of claim 1, further comprising providing one of an acceptance or a rejection of the distributed data.

14. The method of claim 13, wherein providing the acceptance or rejection of the distributed data includes providing a visual indication of the acceptance or rejection.

15. The method of claim 13, further comprising providing an option to modify the distributed data after providing a rejection of the distributed data.

16. The method of claim 1, wherein receiving first data regarding the first purchasing contract and receiving second data regarding the second purchasing contract include includes receiving user input from a graphical user interface.

17. The method of claim 1, wherein at least one of the first data regarding the first purchasing contract and the second data regarding the second purchasing contract include includes purchasing data for at least one of a service and a retail product.

18. The method of claim 1, wherein the second budget is based on a store.

19. The method of claim 1, wherein the first purchasing contract comprises a third purchasing contract and a fourth purchasing contract; and
wherein the third purchasing contract is based on a first product and the fourth purchasing contract is based on a second product.

20. The method of claim 1, wherein the first purchasing contract comprises a third purchasing contract and a fourth purchasing contract; and
wherein the third purchasing contract is based on a first store and the fourth purchasing contract is based on a second store.

21. The method of claim 1, further comprising verifying a fifth purchasing contract based on increasing a third period budget by a value and decreasing a fourth period budget by the value;
wherein the second purchasing contract comprises the fifth purchasing contract and a sixth purchasing contract;
wherein the second budget comprises at least the third period budget and the fourth period budget.

22. The method of claim 21, wherein the fifth purchasing contract is based on a first product and the sixth purchasing contract is based on a second product.

23. The method of claim 21, wherein the fifth purchasing contract is based on a first store and the sixth purchasing contract is based on a second store.

24. A system for allocating data regarding purchasing contracts over temporal periods associated with the purchasing contracts, the system comprising:
a computer-readable medium having computer-executable instructions stored thereon, the computer-executable instructions being executed by a processor to implement
a user interface configured to receive data from a purchaser; and
an open-to-buy (OTB) system configured to
receive first data regarding a first purchasing contract,
receive second data regarding a second purchasing contract,
distribute the received first data regarding the first purchasing contract and the second data regarding the second purchasing contract over the associated temporal periods,
apply at least one rule to the distributed data to determine whether the distribution of the first data regarding the first purchasing contract and the second data regarding the second purchasing contract should be accepted or rejected,
determine a first cost of the first purchasing contract based on a third data regarding the temporal periods associated with the first purchasing contract,
compare a first budget to the first cost,
verify the first purchasing contract based on the first budget exceeding the first cost,
determine means for determining a second cost of the second purchasing contract based on a fourth data regarding the temporal periods associated with the second purchasing contract,
compare a second budget to the second cost,
verify the second purchasing contract based on the second budget exceeding the second cost, and
store at least one of the first purchasing contract, the second purchasing contract, the first cost, and the second cost;
wherein verifying the first purchasing contract based on the first budget exceeding the first cost occurs at the creation of the first purchasing contract based on a first identifier of the first purchasing contract;
wherein verifying the second purchasing contract based on the second budget exceeding the second cost occurs when a purchase order referencing the second purchasing contract is released based on a second identifier of the second purchasing contract.

25. The system of claim 24, wherein the first budget comprises at least a first period budget and a second period budget.

26. The system of claim 25, wherein the first purchasing contract comprises a third purchasing contract and a fourth purchasing contract, wherein the OTB system is further configured to verify the third purchasing contract based on increasing the first period budget by a value and decreasing the second period budget by the value.

27. The system of claim 24, wherein the OTB system is further configured to transmit at least one of a first purchasing order and a second purchasing order based on at least one of verifying the first purchasing contract and verifying the second purchasing contract.

28. The system of claim 24, wherein the OTB system is further configured to generate a strategic financial planning report and at least one of a store planning report, a merchandise planning report, and a roll-out planning report.

29. The system of claim 24, wherein a first budget currency is converted into a planning currency.

30. The system of claim 24, wherein the first budget is based on a product.

31. The system of claim 30, wherein the second budget is based on a store.

32. The system of claim 24, wherein the OTB system is further configured to generate a purchase order based on the distributed data for each temporal period.

33. The system of claim 24, wherein the at least one rule is a budget rule.

34. The system of claim 33, wherein applying the at least one rule to the distributed data includes generating the rule based on a budget associated with the distributed data.

35. The system of claim 34, wherein applying the at least one rule to the distributed data includes comparing at least one of the first cost and the second cost to an amount of available funding in the associated budget.

36. The system of claim 24, wherein the OTB system is further configured to provide one of an acceptance or a rejection of the distributed data.

37. The system of claim 36, wherein providing the acceptance or rejection of the distributed data includes providing a visual indication of the acceptance or rejection.

38. The system of claim 36, wherein the OTB system is further configured to provide an option to modify the distributed data after providing a rejection of the distributed data.

39. The system of claim 24, wherein receiving the first data regarding the first purchasing contract and receiving the second data regarding the second purchasing contract include receiving user input from a graphical user interface.

40. The system of claim 24, wherein at least one of the first data regarding the first purchasing contract and the second data regarding the second purchasing contract include purchasing data for at least one of a service and a retail product.

41. The system of claim 24, wherein the second budget is based on a store.

42. The system of claim 24, wherein the first purchasing contract comprises a third purchasing contract and a fourth purchasing contract; and
    wherein the third purchasing contract is based on a first product and the fourth purchasing contract is based on a second product.

43. The system of claim 24, wherein the first purchasing contract comprises a third purchasing contract and a fourth purchasing contract; and
    wherein the third purchasing contract is based on a first store and the fourth purchasing contract is based on a second store.

44. The system of claim 24, wherein the OTB system is further configured to verify a fifth purchasing contract based on increasing a third period budget by a value and decreasing a fourth period budget by the value;
    wherein the second purchasing contract comprises the fifth purchasing contract and a sixth purchasing contract;
    wherein the second budget comprises at least the third period budget and the fourth period budget.

45. The system of claim 44, wherein the fifth purchasing contract is based on a first product and the sixth purchasing contract is based on a second product.

46. The system of claim 44, wherein the fifth purchasing contract is based on a first store and the sixth purchasing contract is based on a second store.

47. A computer-readable medium having computer-executable instructions stored thereon, wherein the computer-executable instructions are executable by a processor to implement a method for allocating data regarding purchasing contracts over temporal periods associated with the purchasing contracts, the method comprising:
    receiving first data regarding a first purchasing contract in a computerized system;
    receiving second data regarding a second purchasing contract;
    distributing the received first data regarding the first purchasing contract and the second data regarding the second purchasing contract over the associated temporal periods;
    applying at least one rule to the distributed data to determine whether the distribution of the data regarding the first purchasing contract and the second purchasing contract should be accepted or rejected;
    determining a first cost of the first purchasing contract based on a third data regarding the temporal periods associated with the first purchasing contract;
    comparing a first budget to the first cost;
    verifying the first purchasing contract based on the first budget exceeding the first cost;
    determining a second cost of the second purchasing contract based on a fourth data regarding the temporal periods associated with the second purchasing contract;
    comparing a second budget to the second cost;
    verifying the second purchasing contract based on the second budget exceeding the second cost; and
    storing at least one of the first purchasing contract, the second purchasing contract, the first cost, and the second cost;
    wherein verifying the first purchasing contract based on the first budget exceeding the first cost occurs at the creation of the first purchasing contract based on a first identifier of the first purchasing contract;
    wherein verifying the second purchasing contract based on the second budget exceeding the second cost occurs when a purchase order referencing the second purchasing contract is released based on a second identifier of the second purchasing contract.

48. The computer-readable medium of claim 47, wherein the first budget comprises at least a first period budget and a second period budget.

49. The computer-readable medium of claim 48, wherein the first purchasing contract comprises a third purchasing contract and a fourth purchasing contract, wherein the method further comprises verifying the third purchasing contract based on increasing the first period budget by a value and decreasing the second period budget by the value.

50. The computer-readable medium of claim 47, wherein the method further comprises transmitting at least one of a first purchasing order and a second purchasing order based on at least one of verifying the first purchasing contract and verifying the second purchasing contract.

51. The computer-readable medium of claim 47, wherein the method further comprises generating a strategic financial planning report and at least one of a store planning report, a merchandise planning report, and a roll-out planning report.

52. The computer-readable medium of claim 47, wherein a first budget currency is converted into a planning currency.

53. The computer-readable medium of claim 47, wherein the first budget is based on a product.

54. The computer-readable medium of claim 53, wherein the second budget is based on a store.

55. The computer-readable medium of claim 47, wherein the method further comprises generating a purchase order based on the distributed data for each temporal period.

56. The computer-readable medium of claim 47, wherein the at least one rule is a budget rule.

57. The computer-readable medium of claim 56, wherein applying the at least one rule to the distributed data includes generating the rule based on a budget associated with the distributed data.

58. The computer-readable medium of claim 57, wherein applying the at least one rule to the distributed data includes comparing at least one of the first cost and the second cost to an amount of available funding in the associated budget.

59. The computer-readable medium of claim 47, wherein the method further comprises providing one of an acceptance or a rejection of the distributed data.

60. The computer-readable medium of claim 59, wherein providing the acceptance or rejection of the distributed data includes providing a visual indication of the acceptance or rejection.

61. The computer-readable medium of claim 59, wherein the method further comprises providing an option to modify the distributed data after providing a rejection of the distributed data.

62. The computer-readable medium of claim 47, wherein receiving first data regarding the first purchasing contract and receiving second data regarding the second purchasing contract include receiving user input from a graphical user interface.

63. The computer-readable medium of claim 47, wherein at least one of the first data regarding the first purchasing contract and the second data regarding the second purchasing contract includes purchasing data for at least one of a service and a retail product.

64. The computer-readable medium of claim 47, wherein the second budget is based on a store.

65. The computer-readable medium of claim 47, wherein the first purchasing contract comprises a third purchasing contract and a fourth purchasing contract; and
    wherein the third purchasing contract is based on a first product and the fourth purchasing contract is based on a second product.

66. The computer-readable medium of claim 47, wherein the first purchasing contract comprises a third purchasing contract and a fourth purchasing contract; and
    wherein the third purchasing contract is based on a first store and the fourth purchasing contract is based on a second store.

67. The computer-readable medium of claim 47, wherein the method further comprises verifying a fifth purchasing contract based on increasing a third period budget by a value and decreasing a fourth period budget by the value;
    wherein the second purchasing contract comprises the fifth purchasing contract and a sixth purchasing contract;
    wherein the second budget comprises at least the third period budget and the fourth period budget.

68. The computer-readable medium of claim 67, wherein the fifth purchasing contract is based on a first product and the sixth purchasing contract is based on a second product.

69. The computer-readable medium of claim 67, wherein the fifth purchasing contract is based on a first store and the sixth purchasing contract is based on a second store.

\* \* \* \* \*